United States Patent
Cimadamore et al.

(10) Patent No.: US 9,582,394 B2
(45) Date of Patent: Feb. 28, 2017

(54) ENCAPSULATING AND MANAGING DIAGNOSTIC INFORMATION

(75) Inventors: Maurizio Cimadamore, Malahide (IE); Jonathan J. Gibbons, Mountain View, CA (US); Alexander R. Buckley, Cupertino, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 698 days.

(21) Appl. No.: 12/824,992

(22) Filed: Jun. 28, 2010

(65) Prior Publication Data

US 2011/0029960 A1 Feb. 3, 2011

Related U.S. Application Data

(60) Provisional application No. 61/230,058, filed on Jul. 30, 2009.

(51) Int. Cl.
*G06F 11/32* (2006.01)
*G06F 11/36* (2006.01)

(52) U.S. Cl.
CPC ........ *G06F 11/327* (2013.01); *G06F 11/3604* (2013.01); *G06F 11/3664* (2013.01)

(58) Field of Classification Search
None
See application file for complete search history.

(56) References Cited

U.S. PATENT DOCUMENTS

| | | | | |
|---|---|---|---|---|
| 5,737,609 A * | 4/1998 | Reed et al. | | 717/126 |
| 6,000,046 A * | 12/1999 | Passmore | | G06F 11/0709 714/47.1 |
| 6,115,544 A * | 9/2000 | Mueller | | 714/57 |
| 6,633,878 B1 * | 10/2003 | Underwood | | G06Q 10/10 |
| 7,516,025 B1 * | 4/2009 | Williams | | G05B 23/0278 702/182 |
| 2004/0163020 A1 * | 8/2004 | Sidman | | H04L 29/12047 714/100 |
| 2005/0273759 A1 * | 12/2005 | Lucassen et al. | | 717/105 |
| 2006/0080638 A1 * | 4/2006 | Fiore | | 717/104 |
| 2007/0180439 A1 * | 8/2007 | Sundararajan | | G06F 11/3644 717/158 |
| 2008/0077809 A1 * | 3/2008 | Hayler | | G06F 12/1466 713/193 |
| 2008/0295081 A1 * | 11/2008 | Albot | | G06F 11/3688 717/128 |
| 2010/0145978 A1 * | 6/2010 | Anashkin et al. | | 707/769 |

* cited by examiner

*Primary Examiner* — Kevin L Young
(74) *Attorney, Agent, or Firm* — Park, Vaughan, Fleming & Dowler LLP; Mark Spiller

(57) ABSTRACT

The disclosed embodiments provide a system that encapsulates and manages diagnostic information. During operation, the system detects an event that generates diagnostic information, and stores this diagnostic information in a format that preserves semantic information associated with the event. The system also determines an output context (e.g., the intended target environment) for the diagnostic information, and then uses the preserved semantic information to output the diagnostic information in a context-sensitive format suited for the output context. Note that outputting customized diagnostic information that is adapted to a specific target environment facilitates improving the quality of diagnostic information presented to a user.

18 Claims, 6 Drawing Sheets

ENCAPSULATING AND MANAGING DIAGNOSTIC INFORMATION

RELATED APPLICATION

This application hereby claims priority under 35 U.S.C. §119 to U.S. Provisional Patent Application No. 61/230,058 filed 30 Jul. 2009, entitled "DIAGNOSTICS FOR JAVAC," by inventors Maurizio Cimadamore, Jonathan Gibbons, and Alexander Buckley.

BACKGROUND

Field of the Invention

The present invention relates to computer programming. More specifically, the present invention relates to a method and an apparatus for encapsulating and managing diagnostic information that is produced by a computer program that analyzes the source code of computer programs.

Related Art

Computer programs are typically written in source code and then compiled into object code for execution on a specific platform. This compilation process analyzes the source code to find errors or other potential issues that may impact the creation or the eventual execution of the object code. For instance, a compiler typically produces warnings or errors to alert an end user when portions of the source code violate the rules of a programming language.

Unfortunately, high-level object-oriented languages often have non-trivial rules that can lead to difficult-to-understand diagnostic messages. In such a programming environment, even a simple error in the source code may generate expansive, complex diagnostic messages that often mask the actual problem and can easily confuse an end user.

Furthermore, a compiler may be invoked in a range of programming environments. For instance, a compiler may sometimes be invoked from a command line, from within an integrated development environment (IDE), or by an automated build manager. A diagnostic message and format targeted for one environment may be unwieldy or confusing in another environment. For instance, a large block of diagnostic text may be unclear to a programmer who is using a graphical IDE that abstracts away some aspects of the programming language and environment. Similarly, diagnostic output suitable for a graphical IDE may be difficult to represent and/or display in a programming environment that involves command-line compilation of source code.

Hence, what is needed are techniques for producing diagnostic messages without the above-described problems of existing techniques.

SUMMARY

The disclosed embodiments provide a system that encapsulates and manages diagnostic information. During operation, the system detects an event that involves diagnostic information, and stores this diagnostic information in a format that preserves semantic information associated with the event. The system also determines an output context (e.g., an intended target environment) for the diagnostic information, and then uses the preserved semantic information to output the diagnostic information in a context-sensitive format suited for the output context. By outputting customized diagnostic information that is adapted to a specific target environment, the system facilitates improving the quality of diagnostic information presented to a user.

In some embodiments, the system includes a compiler, and receives source code for a program that needs to be compiled. During operation, the system invokes the compiler to process the source code according to a set of rules for the programming language in which the source code is written; an error or other issue encountered during this compilation operation triggers the generation of the diagnostic information. Note that, while the compilation operation may involve compiling the source code into object code, the production of object code is not essential; the described techniques could also be applied in a range of scenarios in which an analyzing compiler checks the source code against the rules of the programming language. For instance, the compiler may translate source code written in the programming language into source code written in a second programming language.

In some embodiments, the system may store one or more of the following pieces of diagnostic information: a key that uniquely identifies the cause of the event; a source file that is associated with the diagnostic information; a position in the source file that is associated with the diagnostic information; information that identifies what kind of diagnostic issue is associated with the diagnostic information; and one or more additional arguments that provide additional diagnostic information. Note that some or all of these pieces of diagnostic information may be optional; for instance, some messages may not refer to any particular source file or include type information (e.g., if the compiler encounters an internal error that prevents it from executing its task).

In some embodiments, the system receives a hierarchy of diagnostic formatters (e.g., a hierarchy of objects, programs, or tools that perform different diagnostic formatting techniques). From this hierarchy, the system selects a diagnostic formatter that suits the specific target environment, and then uses the selected diagnostic formatter to output the diagnostic information. The length, detail, and verbosity of the outputted diagnostic information may vary based on the selected diagnostic formatter, and the selection process may be based on a user preference or a program preference.

In some embodiments, the system uses a "raw" diagnostic formatter that produces diagnostic information in a locale-free format. This diagnostic output can be compared to a reference diagnostic output to determine whether the two outputs match. Comparing outputs in a locale-free format facilitates performing testing by eliminating locale-based differences between two sets of diagnostic outputs.

In some embodiments, the system uses a "tunneling" diagnostic formatter that encodes diagnostic information in an output format that can be passed through one or more intermediate programs while preserving the semantic information associated with the original event. For instance, the tunneling diagnostic formatter may encapsulate different pieces of semantic information for the event using separate XML elements.

In some embodiments, the system can improve the set of diagnostic information that is outputted by performing additional analysis of preserved semantic information to provide more concise and targeted diagnostic information to the user and/or by adjusting the diagnostic information that is outputted based on the source and type of the encountered issue.

Figure 1A:
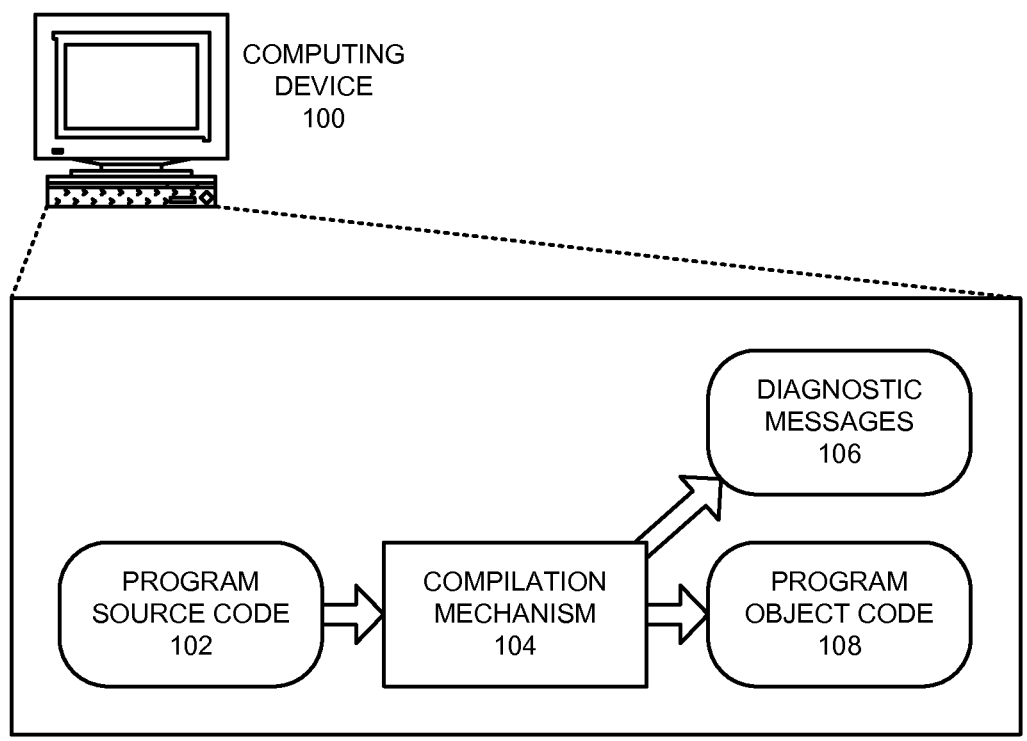
FIG. 1A illustrates an exemplary compilation operation in accordance with an embodiment.

TABLE 1 presents Java™ source code "Test1.java" and compiler diagnostic output in accordance with an embodiment.

TABLE 2 presents Java™ source code "Test2.java" and compiler diagnostic output in accordance with an embodiment.

TABLE 3 presents Java™ source code "Test3.java" and compiler diagnostic output in accordance with an embodiment.

TABLE 4 presents Java™ source code "Test4.java" and compiler diagnostic output in accordance with an embodiment.

TABLE 5 presents two sets of diagnostic outputs encountered during compiler acceptance testing in accordance with an embodiment of the present invention.

TABLE 6 presents exemplary raw diagnostic output and localization information in accordance with an embodiment.

TABLE 7 presents rich diagnostic formatter output for Java™ source code "Test1.java" in accordance with an embodiment.

TABLE 8 presents rich diagnostic formatter output for Java™ source code "Test2.java" in accordance with an embodiment.

TABLE 9 presents rich diagnostic formatter output for Java™ source code "Test3.java" in accordance with an embodiment.

TABLE 10 presents rich diagnostic formatter output for Java™ source code "Test4.java" in accordance with an embodiment.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or non-transitory medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), a dedicated or shared processor that executes a particular software module or a piece of code at a particular time, and/or other programmable-logic devices now known or later developed. When the hardware modules are activated, the hardware modules perform the methods and processes included within the hardware modules.

Complexity in Compiler Diagnostics

FIG. 1A illustrates an exemplary compilation operation. During this compilation operation, compilation mechanism 104 executed on computing device 100 receives program source code 102. Next, compilation mechanism 104 analyzes this program source code 102, and if source code 102 is sufficiently error-free, generates program object code 108. During the compilation process, compilation mechanism 104 also produces diagnostic messages 106 that attempt to pinpoint and describe any errors or other issues encountered during compilation. Note that the term "diagnostic" can encompass any message that conveys information to a user or other program. For instance, diagnostic messages may include (but are not limited to) errors, warnings, notes, and other debug messages. Note also that the term source code can encompass a wide range of structured representations for a program (e.g., structured representations that range from programs written in high-level programming languages to programs specified in lower-level formats such as assembly language and/or object code)

As mentioned above, high-level object-oriented languages such as Java™ (Note that the terms Java, Java Virtual Machine, and Netbeans are a trademarks of Oracle America, Inc. of Redwood City, Calif.) have non-trivial rules (e.g., both syntactical rules and semantic rules) that can cause hard-to-follow diagnostics. Diagnostic messages may sometimes become so verbose that an end user can no longer understand the underlying error or issue. For instance, a diagnostic message may not always clearly describe the meaning of the underlying error. Moreover, useful diagnostic information may be lost or otherwise not presented to the end user due to underlying complexity or poor integration between actual compilation operations and the diagnostic output system.

TABLEs 1-4 illustrate several exemplary sections of Java™ source code, along with the potentially confusing diagnostic messages that are produced by the javac compiler during compilation (note that javac is the reference compiler implementation for the Java™ programming language).

Table 1 illustrates a Java™ source code sample in which a programmer has passed a string rather than the correct Iterable<String> as the argument for the method Compiler. getTask. The important explanatory portion of the diagnostic, the text "cannot be applied to", is hidden behind a number of qualified type names which are not useful or beneficial to the programmer. Note that the illustrated error is a single error in a simple exemplary code section—the complexity of the diagnostic would be likely to be much worse in a real application with longer, more realistic input (e.g., additional erroneous non-null arguments) and additional errors.

TABLE 1

Java ™ Source Code "Test1.java" and Compiler Diagnostic Output

Test1.java Source Code:
import javax.tools.*;
class Test {
  static void test ( ) {
    JavaCompiler compiler = null;
    Compiler.getTask(null, null, null, "Badarg", null, null);
  } }
Javac Compiler Diagnostic Output:
Test1.java:5: getTask(java.io.Writer,javax.tools.JavaFileManager, javax.tools.DiagnosticListener<? super javax.tools.JavaFileObject>, java.lang.Iterable<java.lang.String>, java.lang.Iterable<java.lang.String>, java.lang.Iterable<? extends javax.tools.JavaFileObject>) in javax.tools.JavaCompiler cannot be applied to (<nulltype>, <nulltype>, <nulltype>, java.lang.String, <nulltype>, <nulltype>)
    compiler.getTask (null,null,null,"Badarg",null,null);
          ^
1 error Table 2 illustrates another Java™ source code sample that involves a Java™ language feature called "generics," and the resulting diagnostic message produced by javac. The generic method declaration <T extends Number> void m(T t1, T t2) introduces a type variable T that will be inferred for each invocation of m based on the types of the arguments passed to m, such that the type T of m's formal parameters t1 and t2 in an invocation is replaced by the type inferred for T in that invocation. The method m is called with two arguments of type String. However, none of the defined methods is applicable for two String arguments. The first defined method accepts only one argument. The second method accepts a variable-arity list of arguments (denoted by " . . . "), but only accepts arguments of type Double, not of type String. The third defined method is inapplicable because of a bound mismatch, wherein T is required to extend type Number (and type String does not extend type Number). The illustrated diagnostic message does not clearly explain that the compiler found three methods named m, but that none of these three methods were applicable. Note that the diagnostic message produced by the compiler is the same message that would be produced if no method m were defined at all.

TABLE 2

Java ™ Source Code "Test2.java" and Compiler Diagnostic Output

Test2.java Source Code:
class Test{
  void m(Integer t1) { }
  void m(Double... t1) { }
  <T extends Number> void m(T t1, T t2) { }
  void test ( ) {
    m("","");
  } }
Javac Compiler Diagnostic Output:
Test2.java:7: cannot find symbol
symbol :method m(java.lang.String,java.lang.String)
location:class Test
    m("","");
    ^
1 error Table 3 illustrates a Java™ source code sample in which a generic class Foo introduces a type variable T that happens to have the same name as a fresh type variable T introduced by generic method foo in generic class Foo. The type variable T introduced by generic class Foo has bound string, while the type variable T introduced by generic method foo has bound Integer. Line 3 invokes the method test with an argument whose type is the type variable T introduced by generic method foo, while the declaration of method test accepts a formal parameter whose type is the type variable T introduced by generic class Foo. Because the two type variables called T have different bounds, the invocation at line 3 is not type-correct, and so is not allowed by the rules of the Java™ programming language. The illustrated diagnostic output refers to both the type variable T introduced by generic class Foo (e.g., the diagnostic output "test (T) in Foo<T>") and the type variable T introduced by generic method foo (e.g., the diagnostic output "cannot be applied to (T)" refers to the formal parameter type of test). The output is ambiguous because it contains no indication that the type variable T introduced by generic class Foo is not the same type variable T introduced by generic method foo. The ambiguous diagnostic forces the user to examine the source code to determine that there are two type variables called T, and moreover that the type variables have different bounds.

Table 4 illustrates a fourth Java™ source code sample that also involves generics. In the illustrated source code, the function choose accepts two variables of type Z, and the compiler needs to infer the correct type for Z from the actuals ArrayList<B> and ArrayList<C>. Inferred types can involve substantial complexity, and as a result the diagnostic output from the compiler is confusing for an average user. For instance, the diagnostic message associated with a single type takes three lines, and it is not clear what capture #467 means and what the & characters represent.

TABLE 3

Java ™ Source Code "Test3.java" and Compiler Diagnostic Output

Test3.java Source Code:
class Foo<T extends String>{
  <T extends Integer> void foo(T t) {
    test (t);
  }
  void test(T t) { }
}
Javac Compiler Diagnostic Output:
Test3.java:3: test(T) in Foo<T> cannot be applied to (T)
    test (t);
    ^
1 error

TABLE 4

Java ™ Source Code "Test4.java" and Compiler Diagnostic Output

Test4.java Source Code:
import javax.util.*;
class A<X>{ }
class B extends A<String>{ }
class C extends A<Integer>{ }

TABLE 4-continued

Java ™ Source Code "Test4.java" and Compiler Diagnostic Output

```
class Test {
    static <Z> Z choose (Z th, Z that) {return null; }
    void main ( ) {
        C c = choose(new ArrayList<B> ( ), new ArrayList<C> ( ) );
} }
Javac Compiler Diagnostic Output:
Test4.java:8: incompatible types
found: java.util.ArrayList<capture#467 of ? extends A<? extends
java.lang.Object&java.io.Serializable&java.lang.Comparable<?
extends
java.lang.Object&java.io.Serializable& java.lang.Comparable<?>>>>
required: C
        C c = choose(new ArrayList<B> ( ), new ArrayList<C> ( ) );
          ^
1 error
```

The preceding examples illustrate potential complexity that can arise in diagnostics produced by a compiler for even simple programs. One underlying problem is that, upon finding an error, traditional compiler techniques typically use the semantic information associated with the error to look up and concatenate a series of text strings to form a text diagnostic message that is immediately outputted to the user. Unfortunately, after this diagnostic message has been produced and outputted, the original semantic information is often discarded. The displayed diagnostic message may include some valuable information, but may also be long, garbled, and/or confusing. Moreover, an end user may not be able to understand (and fix) the underlying issue based on such confusing text output, and cannot make use of other post-processing tools to gain further insight because such tools do not have access to the same level of semantic knowledge available in the compiler.

Another issue with outputting a diagnostic message as a text string is that the output may not match the environment in which the programmer is working. For instance, if the programmer is executing a compiler as a stand-alone tool from a command line, outputting the diagnostic message as a text string may be reasonable (e.g., as occurs when executing the javac compiler from the command line). However, when a compiler is executed as a component of a larger, more sophisticated development environment, a text string may no longer be a desired output. For example, the compiler may be used as a sub-component within a larger graphical integrated development environment (IDE) that abstracts away many low-level programming details (e.g., file paths, class dependencies, compiler options, etc.). Note that a low-level diagnostic text string output from the compiler may not make any sense to a programmer working at a higher level. Furthermore, the IDE might be able to provide much more pinpointed and useful diagnostic information (e.g., direct graphical feedback in the affected source code section) if there were some way that it could access and make use of the semantic information available in the compiler.

Figure 1B:
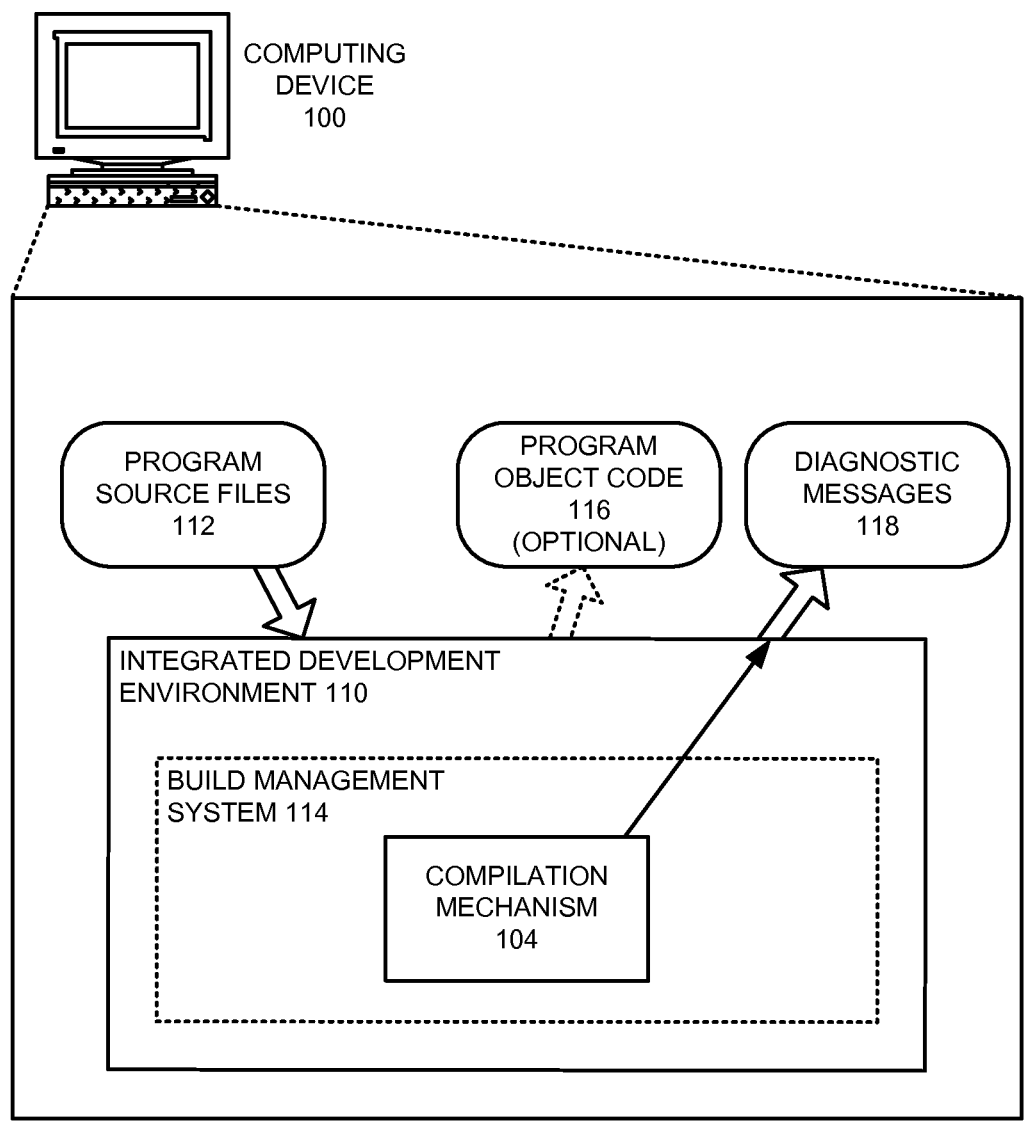
FIG. 1B illustrates an exemplary compilation operation occurring in an integrated development environment in accordance with an embodiment.

FIG. 1B illustrates an exemplary compilation operation occurring in an IDE 110. IDE 110 includes a build management system 114 that invokes stand-alone compilation mechanism 104 to compile a project that encompasses a set of program source files 112. As in FIG. 1A, compilation mechanism 104 analyzes the program source code in program source files 112, and if the source code is sufficiently error-free, may generate program object code 116 (note that an IDE may sometimes use an underlying compiler primarily to find errors in user source code, and not necessarily always generate object code). Compilation mechanism 104 also outputs diagnostic messages 118 that attempt to pinpoint and describe any errors or other issues encountered during compilation. However, in this environment, a programmer using IDE 110 may be sufficiently removed from the invocation details for compilation mechanism 104 that low-level diagnostic text strings output by compilation mechanism 104 may be particularly unwieldy and confusing. A programmer would benefit from being able to receive diagnostic messages that are understood by and specifically adapted to the capabilities of IDE 110; unfortunately, the text strings output by compilation mechanism 104 may not convey sufficient semantic information to enable such a desired level of diagnostic output.

Embodiments of the present information seek to improve diagnostic output for programs by preserving semantic information as long as possible and by providing an architecture that allows diagnostic information to be interpreted and formatted in a range of different ways to maximize user understanding of underlying issues. One embodiment of the present invention provides a "pluggable" diagnostic subsystem that allows the use of different diagnostic formatting and analysis techniques to expand and improve the quality of the diagnostic information that is provided to programmers and testers.

Structured Representations and Pluggable Diagnostic Formatters

One embodiment of the present invention facilitates storing (and preserving) diagnostic information in a structured representation. Such structured representations can then be interpreted by a hierarchy of formatters that analyze and present the stored diagnostic information in a range of different ways depending on the desired output environment (or context).

In some embodiments, instead of converting diagnostic information into a string, the diagnostic system manages the diagnostic information as a self-describing object with fields that preserve semantic information for later analysis and formatting. For instance, such objects may be represented as rich objects (in an object-oriented programming language) that store information that pinpoints the issue, a location associated with the issue, and other useful details. Storing diagnostic information in such a representation retains as much of the original semantic knowledge for as long as possible, in a format that facilitates further queries into, filtering of, and interaction with the stored data.

In one embodiment of the present invention, in a compiler context, a structured representation for a diagnostic may be an object that includes fields and methods related to one or more of the following:

a key: a locale-independent string or value that uniquely identifies an underlying diagnostic issue (e.g., a string such as "compiler.err.cant.apply.symbol," which can be used to look up a locale-dependent message associated with the diagnostic issue).

a position: information or a queryable object that pinpoints the specific source code section associated with the diagnostic issue.

a source: an object that wraps (or contains) the source file (if any) associated with the diagnostic issue.

the kind of diagnostic involved: information indicating what kind of diagnostic issue is occurring (e.g., a value that indicates the kind to be DiagnosticKind.ERROR).

one or more additional arguments (e.g., additional objects, strings, or values) that provide additional information about the diagnostic issue.

In some embodiments, diagnostic information stored in a structured representation can be "plugged" into a range of different formatters that customize the diagnostic output. More specifically, the structured representation provides flexibility for situations where the diagnostic system does not know in advance how diagnostic messages should be presented; the raw semantic data is preserved, and when needed, each given diagnostic formatter can directly access the diagnostic objects to process and format diagnostic messages for a consumer in a targeted, context-specific way. Such techniques for generating context-specific customized diagnostics are in contrast with immediately generating a "one size fits all" diagnostic text string upon encountering a diagnostic issue.

Different diagnostic formatters geared toward different clients may produce diagnostic outputs that vary in length, detail, and verbosity. Consider a compiler that, upon encountering an error, generates an object representing the error in terms of its position in source code and the specific details of the code that could be in error. A range of diagnostic formatters may want to process this error in different ways for various clients: a command-line output for the compiler might simply report the error to the user and stop; a test harness that evaluates the quality of the compiler could compare the error to a pre-defined error emitted by a reference compiler; and an IDE could inspect the object, provide a hyperlink to a section of a specification related to the underlying issue, and suggest alternatives to the programmer's code at precisely the right point. In general, pluggable formatters which can compute and emit diagnostics that are customized to and able to take advantage of specific client contexts can provide substantial benefits.

Figure 2:
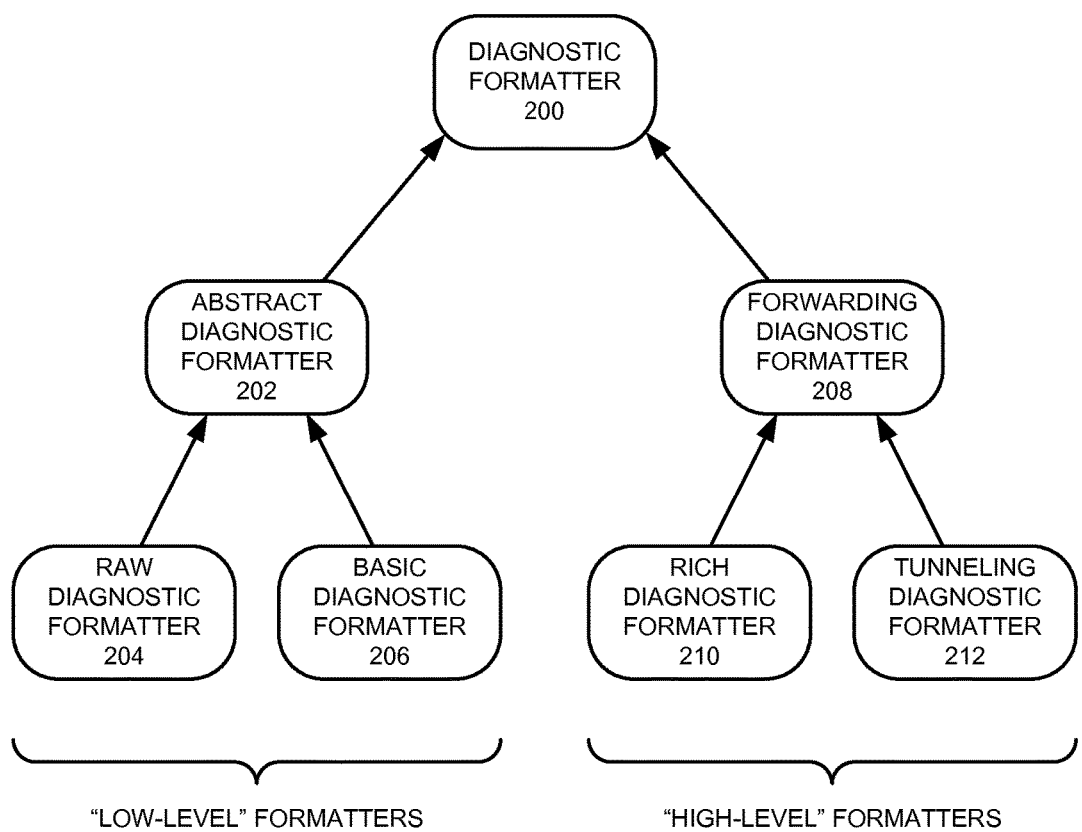
FIG. 2 illustrates an exemplary class hierarchy for a set of pluggable diagnostic formatters that provide different diagnostic output features for a Java™ compiler in accordance with an embodiment.

FIG. 2 illustrates an exemplary class hierarchy for a set of pluggable diagnostic formatters that provide different diagnostic output features for a Java™ compiler. A top-level DiagnosticFormatter interface 200 defines a set of common methods for rendering different parts of the structured representation for a diagnostic. A foundational DiagnosticFormatter is implemented by the AbstractDiagnosticFormatter 202 abstract class, which is in turn sub-classed by concrete formatter classes with useful functionality. For instance, a raw diagnostic formatter 204 provides a detailed but locale-free output that can be used during testing. A basic diagnostic formatter 206 provides similarly low-level diagnostic output suitable for command line diagnostics in the form of localized text strings. The foundational DiagnosticFormatter can also be implemented by a ForwardingDiagnosticFormatter 208 abstract class, which pre-processes diagnostic information (e.g., decorates the structured representation for the diagnostic issue with additional useful information) and then delegates the task of producing the diagnostic output associated with the decorated diagnostic information to a low-level formatter (such as raw diagnostic formatter 204 or basic diagnostic formatter 206). For instance, rich diagnostic formatter 210 may include a set of rules that use additional analysis and/or semantic knowledge to make existing diagnostic information stored in a structured representation more concise and understandable. Tunneling diagnostic formatter 212 includes a set of methods that facilitate tunneling the semantic information for a diagnostic through several intermediate applications to a higher-level program (e.g., to an IDE). Note that some applications may define their own diagnostic formatters to provide an even more customized and application-specific diagnostic output.

Note that, while different formatters may provide a range of functionality and output different levels of information, a set of formatters may support a common model for the structure and size of their diagnostic texts. For instance, in FIG. 2, an overall configuration interface associated with all diagnostic formatters 200 may define standard components of a diagnostic for all diagnostic outputs. For a pluggable compiler diagnostic system, common diagnostic output components may include:
 a summary (e.g., a short, one-line description of the diagnostic);
 a longer, detailed description of the diagnostic;
 a source (e.g., a position in the source code to which the diagnostic applies);
 sub-diagnostics (e.g., a set of diagnostic information relevant to hierarchical diagnostics with multiple sub-sections); and
 a specification (e.g., a reference to the section of the programming language's specification that justifies the diagnostic).

The specific diagnostic components presented in a diagnostic output may also depend on the specific compiler and on a set of user preferences that are read and used to configure a formatter class.

The following sections describe in more detail the features and benefits of several exemplary diagnostic formatters that are enabled by the above-described techniques.

Raw Diagnostic Modes that Facilitate Compiler Acceptance Testing

Localization is a process in which message codes from a program are used as indices into a local resource bundle (e.g., an installed language pack) to generate a diagnostic message that is language- and/or region-appropriate for the end user. In many situations, outputting localized diagnostic messages benefits the end user. However, localized diagnostic messages may sometimes interfere with ongoing tests that compare current program outputs with known good diagnostic test outputs (e.g., reference diagnostic messages stored in "golden files"). For instance, accidentally comparing diagnostic messages that were output by two different resource bundles (e.g., for two different languages) will typically cause large numbers of failures in such tests. Changes to a common local resource bundle (e.g., to fix grammatical errors in the diagnostic messages) will also raise flags for the specific outputs that have changed. Many programs only output localized diagnostic messages, which can complicate ongoing program testing. Furthermore, a pluggable diagnostic system that puts warning and error output for any source code under the control of user code may also result in changed diagnostic messages that do not match the reference diagnostics.

In some embodiments, raw diagnostic formatters provide a generic, low-level approach that facilitates outputting diagnostic information in a locale-independent, non-natural language format for comparison testing. Such a raw diagnostic formatter may switch off all localization and strip down diagnostic messages to a raw format that facilitates printing out raw diagnostic keys that can easily be checked by automatic tools (e.g., "compiler.err.method.not.found"). As long as these locale-independent keys are not changed, successive versions of the diagnostic output can be compared to the known good diagnostic test output to confirm ongoing program correctness. In an alternative embodiment, the raw mode may be configured to output US English (or some other base default language) error messages during locale-independent tests.

Note that automatic comparison of a program diagnostic that is displayed as text (whether on a text command line, in an IDE, in a file, etc.) can be complicated by changes to a range of text properties that include: line indentation on any given line; message structure on any given line; the ordering of multiple lines; the full filepaths of source files being flagged for a diagnostic issue; and localization issues. TABLE 5 illustrates a situation in which a compiler's diagnostic output for a test suite differs from a set of diagnostic outputs. The errors match in semantics (with the subsequent diagnostic output actually providing a more informative diagnostic than the reference compiler), but a direct character-to-character comparison does not return a match. Discrepancies between the reference and subsequent outputs include: the use of a full filepath for the source file (/homes/arb/src/Test.java) instead of a "canonicalized" form that shows only the filename, Test.java, and no path; a different textual description of the error; and different indentation and display of the offending source code. Comparing the subsequent diagnostic output in a non-US English locale (e.g., a French locale) would even further muddle such a comparison.

TABLE 5

Comparison of Reference and Subsequent Diagnostic Outputs

Reference Diagnostic Output:
Test.java:3: no method found in Foo to take arguments (int,int)
   >> test(1,2); <<
Subsequent Diagnostic Output:
/homes/arb/src/Test.java:3: test(String,int) in Foo cannot be applied to (int,int)
test(1,2);
^

To further simplify the comparison of diagnostic outputs for testing purposes, a hierarchy of pluggable diagnostic formatters may include a range of raw diagnostic formatting modes that include (but are not limited to):

A "super raw" mode in which diagnostic messages are formatted to be as close as possible to the compiler's internal form of the diagnostic: no indentation or multi-line structuring occurs; filepaths are not canonicalized; there is no localization; and acceptance testing against a reference diagnostic message primarily checks the diagnostic type and basic parameters such as the line number in the source file.

A raw mode in which: diagnostic messages are formatted using a standard amount of indentation, multi-line structuring, and canonicalized filepaths; there is no localization; and acceptance testing against a reference diagnostic message checks the syntactic layout of the diagnostic message.

A localized raw mode in which: diagnostic messages are formatted to be as close as possible to the compiler's internal form of the error, but filepaths are canonicalized and diagnostic text is localized; and acceptance testing against a reference diagnostic message checks a localized diagnostic type that is unencumbered by other formatting.

TABLE 6 illustrates an exemplary raw diagnostic output and localization information for the diagnostic message illustrated in TABLE 5. In the raw format, compiler.err.cant-.resolve.location.args is the non-localized message key, and its arguments are:

1. kindname.method—a key for the localized token "method";

2. test—the method name this diagnostic message refers to;

3. int,int—the actual argument types of the erroneous method call;

4. kindname.class—a key for the localized token "class"; and

5. Foo—the name of the class in which method test is defined.

In contrast to the raw diagnostic output, a localization process accepts these same arguments and a resource string (e.g., a localization template) as inputs. The localization template specifies a message layout. The localization process inserts the arguments into the argument placeholders (e.g., {0}, {1}, etc.) of the localization template, and then outputs the illustrated localized diagnostic output.

TABLE 6

Exemplary Raw Diagnostic Output and Localization Information

Raw Diagnostic Output:
Test.java:5:3: compiler.err.cant.resolve.location.args:
kindname.method, test, int, int, kindname.class, Foo
Localization Template:
compiler.err.cant.resolve.location.args=\
   cannot apply {0} {1} in {3} {4} with arguments ({2})
Localized Diagnostic Output:
cannot apply method test in class Foo with arguments (int,int)

Rich Diagnostic Formatters

In some embodiments, a rich diagnostic formatter uses additional analysis or semantic knowledge to provide more concise, understandable diagnostic messages. For instance, a rich diagnostic formatter may provide an additional set of programming-language-specific heuristics. For the Java™ language, such methods may:

simplify the diagnostic message by shortening redundant qualified type names to simple type names (e.g., convert java.lang.String to String);

automatically detect and resolve situations where simple type names clash in a single diagnostic (e.g., when a diagnostic involves both java.lang.String and foo.String, preserve the use of the qualified names instead of simplifying the type names);

shorten filenames;

slightly modify type variables with the same simple name in source code (which is a not-uncommon occurrence) so that they are unique;

describe synthetic type variables generated by the Java™ language mechanism of "capture conversion" by using a list of "where clauses" (e.g., ensure that each element of the list contains additional information about the type that it refers to); and reorder information in the diagnostic message so that the actual problem is described first.

Such techniques can substantially improve end-user understanding of diagnostic messages.

Tables 7-10 illustrate improved diagnostic messages output by a pluggable rich diagnostic formatter for the source code originally illustrated in TABLEs 1-4. In TABLE 7, the pluggable rich diagnostic formatter has improved the diagnostic message by dropping irrelevant prefixes from type names. The diagnostic message has also generally been improved by: reordering the facts so that the actual problem is described first; shortening the notional name given to the null type (from <nulltype> to #null); and giving more information about why no suitable method was found.

In TABLE 8, the rich diagnostic formatter has improved the diagnostic message by: explaining that the methods that were found are not applicable given the actual argument list; and inserting a where clause that explains why the type inference has failed (due to a bound mismatch).

In TABLE 9, the rich diagnostic formatter has improved the diagnostic message by: distinguishing that the two type variables are distinct; and inserting a where clause that reports the bound associated with each type variable so that the user can better understand the problem.

In TABLE 10, the diagnostic message is still complex, but the rich diagnostic formatter has improved the diagnostic message by: moving essential error information into the first three lines of the diagnostic message; and improving the previous capture #467 syntax using where clauses with information that recalls Java™ syntax (extends, implements, ?) and clarifying that there are issues arising from fresh type variables and intersection types.

TABLE 7

Rich Diagnostic Formatter Output for Source Code "Test1.java"

```
Test1.java Source Code:
import javax.tools.*;
class Test {
  static void test ( ) {
    JavaCompiler compiler = null;
    Compiler.getTask (null, null, null, "Badarg", null, null);
} }
Javac Compiler Diagnostic Output:
Test1.java:5: no suitable method found for
getTask(#null,#null,#null,String,#null,#null)
    compiler.getTask(null, null, null,
                ^
  inapplicable method found: JavaCompiler.getTask(Writer,
JavaFileManager, DiagnosticListener<? super JavaFileObject>,
Iterable<String>, Iterable<String>, Iterable<? extends
JavaFileObject>)
    (argument type String does not conform to formal parameter type
    Iterable<String>)
1 error
```

TABLE 8

Rich Diagnostic Formatter Output for Source Code "Test2.java"

```
Test2.java Source Code:
class Test{
  void m(Integer t1) { }
  void m(Double... t1) { }
  <T extends Number> void m(T t1, T t2) { }
  void test ( ) {
    m("","");
} }
Javac Compiler Diagnostic Output:
Test2.java:7: no suitable method found for m(String,String)
    m("","");
    ^
inapplicable method found: Test.<T>m(T,T)
  (inferred type argument(s) String do not conform to bounds of
  type variable(s) T)
inapplicable method found: Test.m(Integer)
  (actual and formal argument lists differ in length)
inapplicable method found: Test.m(Double...)
  (argument type String does not conform to vararg element type
  Double)
where T is a type variable:
  T extends Number
    (declared in method <T>m(T,T))
1 error
```

TABLE 9

Rich Diagnostic Formatter Output for Source Code "Test3.java"

```
Test3.java Source Code:
class Foo<T extends String>{
  <T extends Integer> void foo(T t) {
    test(t);
  }
  void test(T t) { }
}
Javac Compiler Diagnostic Output:
Test3.java:3: no suitable method found for test(T #1)
    test(t);
    ^
inapplicable method found: Foo.test(T #2)
  (argument type T #1 does not conform to formal parameter type T
  #2)
where T #1, T #2 are type variables:
  T #1 extends Integer
    (declared in method <T #1>foo(T #1))
  T #2 extends String
    (declared in class Foo)
1 error
```

TABLE 10

Rich Diagnostic Formatter Output for Source Code "Test4.java"

```
Test4.java Source Code:
import javax.util.*;
class A<X>{ }
class B extends A<String>{ }
class C extends A<Integer>{ }
class Test {
  static <Z> Z choose (Z th, Z that) { return null; }
  void main ( ) {
    C c = choose(new ArrayList<B>( ), new ArrayList<C>( ));
} }
Javac Compiler Diagnostic Output:
Test4.java:8: incompatible types
    C c = choose(new ArrayList<B> ( ),
           ^
required: C
found: ArrayList<? #1>
where ? #1 is a fresh type variable:
  ? #1 extends A<? extends & #1>
    (capture of ? extends A<? extends & #1>)
where & #1,& #2 are intersection types:
  & #1 implements Serializable,Comparable<? extends & #2>
  & #2 implements Serializable,Comparable<?>
1 error
```

Tunneling Diagnostic Formatters

Large applications written in high-level object-oriented programming languages (such as Java™) often involve build environments with complex toolchains. Compiling source code to an intermediate or executable format (such as bytecode for a Java Virtual Machine™) is often only one of many steps. For example, one popular build management tool, Apache Maven™ (Note that the terms Apache Maven and Apache Ant are trademarks of The Apache Software Foundation), coordinates potentially dozens of steps in the build process, with the compilation of source code comprising only one step. Compilation failures arising from invalid source code typically stop the entire build process.

Communicating complex diagnostic messages from one step in such a process (e.g., from a tool such as a compiler) up to an IDE or a build management tool can be challenging, especially when the toolchain includes disparate tools from numerous vendors whose primary mechanism for sharing information comprises passing and receiving textual string values. As described above, converting a diagnostic message to a text string typically involves an undesirable loss of semantic information for the diagnostic. What would be more desirable is a technique for passing the gathered semantic information to the top level of the build system or IDE so that a programmer's preferred development environment is fully apprised of the compiler's knowledge about the diagnostic, and the underlying issue can be presented to the programmer in a clear and understandable manner.

In some embodiments, a tunneling diagnostic formatter encapsulates a structured representation of a diagnostic into a format that preserves semantic meaning but can be passed to a higher level in the build hierarchy. "Tunneling" the semantic information in this manner allows the higher-level program to interpret and present the diagnostic information to the end user in a manner that matches (and takes advantage of) the level of abstraction of the higher-level program (as opposed to the level of abstraction of the lower-level program generating the diagnostic information, which may not know how to clearly present such information appropriately at the higher level). For instance, a tunneling diagnostic formatter associated with a tool deep in the build process may encode the semantic information for a diagnostic into a structured XML document that can then be passed as a text string up to the higher-level program overseeing the build process without losing fidelity.

Note that such encapsulation and tunneling techniques are not limited to using XML; a tunneling diagnostic formatter can use any representation and/or technique that facilitates tunneling semantics associated with diagnostic information through intermediate programs in a multi-component system. XML is, however, well-suited for tunneling information in build environments that use text strings to pass information (e.g., Java™ IDEs such as Netbeans™, which uses sub-tools such as Apache Ant™ and GNU Make that are configured to pass ASCII text strings). Note that, in order to pass information successfully, the tunneling diagnostic formatter and the receiving program will typically need to use an agreed-upon formal XML schema, and the high-level tool will need to recognize that the string being returned from the lower-level tool is in fact an XML document describing a diagnostic. Moreover, some special characters (e.g., "<" and ">" for XML) may need to be temporarily recoded to successfully pass the diagnostic information through middle layers that restrict or are otherwise sensitive to such characters.

As described above, tunneling diagnostic information facilitates transferring semantic information for a diagnostic from a lower-level component to a high-level program that actually displays the diagnostic information to the user in a more sophisticated context. For example, instead of simply outputting a text string generated by a low-level compiler, an IDE receiving tunneled diagnostic information in a format that preserves the underlying semantic information can use the available information to: retrieve specific XML elements representing information about the issue to specifically identify and graphically display the section of the source file containing the issue (e.g., highlighting or underlining the most relevant subsection in red to indicate a spot likely to be the source of the issue); output a brief message that, in conjunction with the graphical display, clearly conveys the issue to the end user; and provide a hyperlink or other representation that summarizes and links to a more detailed discussion of the underlying issue (e.g., by displaying a tool tip that reads, for example, "Highlighted code section violates language specification Z in section X.Y; click here to read"). In another example, a non-graphical build management tool may choose to log the error in full and take action to reverse the effects of other build steps, possibly depending on the exact nature of the error specified in an XML element.

Note that, in some environments, a program may be configured to emit multiple issues or errors before halting and tunneling diagnostic information to a higher level, in contrast with more typical techniques that halt after encountering a single issue. Hence, the XML transfer (or other tunneling mechanism) may include representations for multiple issues.

Other efforts to provide more meaningful diagnostic information to a higher-level program attempt to do so by promoting the use of XML-formatted diagnostics across all of the associated build tools, or by making the set of components more integrated and monolithic, so that diagnostic information can be passed up directly in native objects. However, such attempts may involve substantial standardization efforts across all of the component developers (e.g., to standardize XML-formatted diagnostics across all components) or substantial additional coordination and integration. The described techniques depend only on knowledge of a shared schema and awareness of the tunneling capability in the two end-point programs (e.g., in the low-level program generating the diagnostic information, and the top-level program that will be displaying the diagnostic message).

Chained Diagnostic Formatters

In practice, only one formatter at a time is likely to be plugged in to a compiler (or other program), and the total output is likely to be only a single diagnostic message (e.g., representing the first erroneous situation detected by the compiler). However, a program may support using multiple diagnostic formatters either simultaneously or progressively. Examples include:

allocating different diagnostic formatters for different error types and/or source files;

using a tunneling diagnostic formatter to tunnel diagnostic information to an IDE while simultaneously using a rich diagnostic formatter to log messages to a file;

using a "basic" diagnostic formatter initially (e.g., when encountering invalid command line options or basic errors in the program environment) and then switching to a rich diagnostic formatter after the program is properly initialized; and streaming the concise, descriptive information generated by a rich diagnostic formatter to a raw diagnostic formatter that removes localization effects (e.g., performing the same logic operations as the rich diagnostic formatter, but then using a raw formatter's output format), and then tunneling the resulting diagnostic information to a higher-level program using a tunneling formatter (such as the XML diagnostic formatter).

The structured representation of diagnostic information and the pluggable, modular nature of the diagnostic formatters facilitate such interactions and transformations, thereby providing a range of analysis and refinement possibilities while preserving the semantic information for diagnostics.

Note that techniques for choosing and invoking a diagnostic formatter may vary. For instance, a programmer may explicitly select a diagnostic formatter using a command line option or graphical user interface. Alternatively, in a more sophisticated environment, a program may choose (or customize) a desired diagnostic formatter automatically based on the environment and source input, and pass structured diagnostic objects to this formatter to process and display an output.

Figure 3:
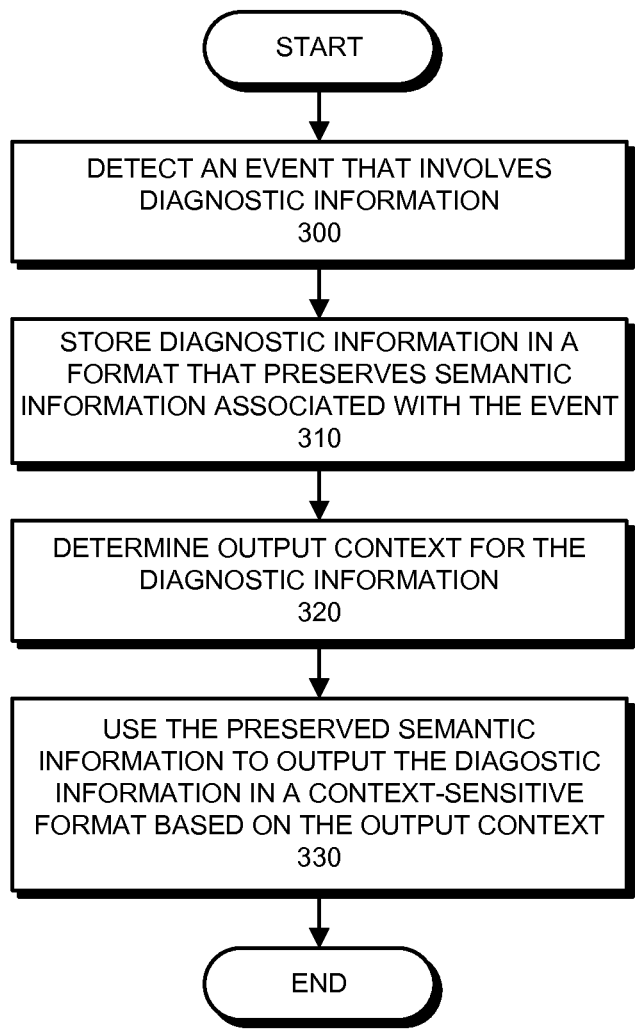
FIG. 3 presents a flow chart illustrating the process of encapsulating and managing diagnostic information in accordance with an embodiment.

FIG. 3 presents a flow chart that illustrates the process of encapsulating and managing diagnostic information. During operation, the system detects an event that involves diagnostic information (operation 300). The system stores this diagnostic information in a format that preserves semantic information associated with the event (operation 310). After determining an output context for the diagnostic information (operation 320), the system uses the preserved semantic information to output the diagnostic information in a context-sensitive format based on the output context (operation 330). Outputting customized diagnostic information that can be adapted based on the output context facilitates improving the quality of diagnostic information presented to a user.

Note that the described techniques can be applied to a range of compilation tools, including interpreters, just-in-time (JIT) compilers in a virtual machine, and programming language compilers. Note also that, while the described techniques and examples are presented in the context of compilers, the described techniques are not limited to compilers, and can be applied to any program or application that outputs diagnostic information. For instance, the described techniques can be applied to manage and encapsulate diagnostic information in any system where a program: (1) performs analysis of input; (2) internally constructs a detailed understanding of the input and issues in the input; and (3) then attempts to convey potential issues to a user or other receiving entity.

In summary, embodiments of the present invention involve storing (and preserving) diagnostic information in a structured representation. These structured representations can then be interpreted by a hierarchy of formatters that analyze and present the stored diagnostic information in a range of different ways depending on the desired output environment (or context). For example, a raw diagnostic formatter can be used to facilitate compiler acceptance testing; a rich diagnostic formatter can be used to improve the understandability of diagnostic messages for a given environment; and a tunneling diagnostic formatter can be used to pass diagnostic information to a higher-level program without losing underlying semantic information.

Computing Environment

In some embodiments of the present invention, techniques for encapsulating and managing diagnostic information can be incorporated into a wide range of computing devices in a computing environment.

Figure 4:
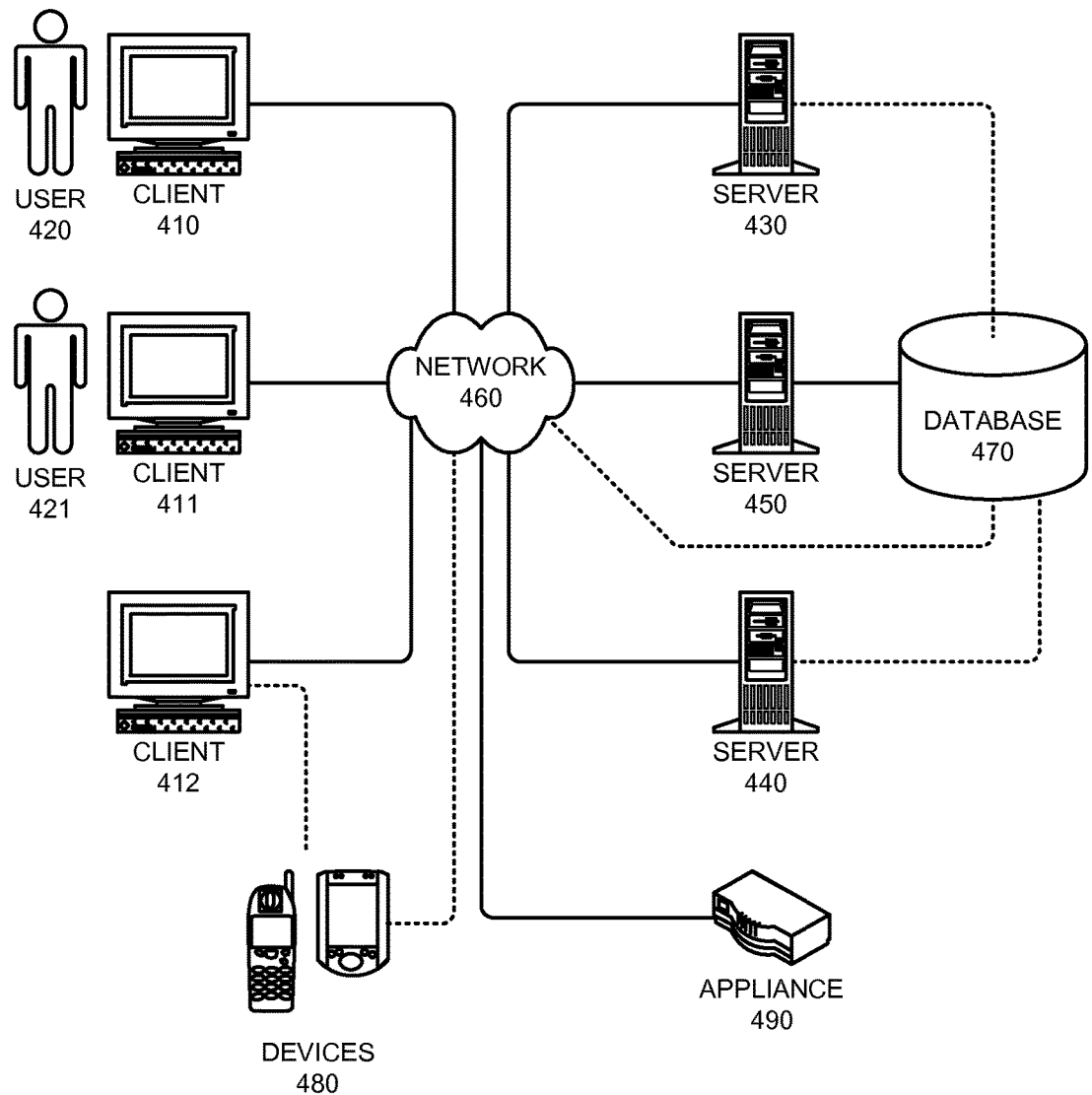
FIG. 4 illustrates a computing environment in accordance with an embodiment.

FIG. 4 illustrates a computing environment 400 in accordance with an embodiment of the present invention. Computing environment 400 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 4, computing environment 400 includes clients 410-412, users 420 and 421, servers 430-450, network 460, database 470, devices 480, and appliance 490.

Clients 410-412 can include any node on a network that includes computational capability and includes a mechanism for communicating across the network. Additionally, clients 410-412 may comprise a tier in an n-tier application architecture, wherein clients 410-412 perform as servers (servicing requests from lower tiers or users), and wherein clients 410-412 perform as clients (forwarding the requests to a higher tier).

Similarly, servers 430-450 can generally include any node on a network including a mechanism for servicing requests from a client for computational and/or data storage resources. Servers 430-450 can participate in an advanced computing cluster, or can act as stand-alone servers. For instance, computing environment 400 can include a large number of compute nodes that are organized into a computing cluster and/or server farm. In one embodiment of the present invention, server 440 is an online "hot spare" of server 450.

Users 420 and 421 can include: an individual; a group of individuals; an organization; a group of organizations; a computing system; a group of computing systems; or any other entity that can interact with computing environment 400.

Network 460 can include any type of wired or wireless communication channel capable of coupling together computing nodes. This includes, but is not limited to, a local area network, a wide area network, or a combination of networks. In one embodiment of the present invention, network 460 includes the Internet. In some embodiments of the present invention, network 460 includes phone and cellular phone networks.

Database 470 can include any type of system for storing data in non-volatile storage. This includes, but is not limited to, systems based upon magnetic, optical, or magneto-optical storage devices, as well as storage devices based on flash memory and/or battery-backed up memory. Note that database 470 can be coupled: to a server (such as server 450), to a client, or directly to a network. In some embodiments of the present invention, database 470 is used to store information related to diagnostic information and/or diagnostic formatters. Alternatively, other entities in computing environment 400 may also store such data (e.g., servers 430-450).

Devices 480 can include any type of electronic device that can be coupled to a client, such as client 412. This includes, but is not limited to, cell phones, personal digital assistants (PDAs), smart-phones, personal music players (such as MP3 players), gaming systems, digital cameras, portable storage media, or any other device that can be coupled to the client. Note that, in some embodiments of the present invention, devices 480 can be coupled directly to network 460 and can function in the same manner as clients 410-412.

Appliance 490 can include any type of appliance that can be coupled to network 460. This includes, but is not limited to, routers, switches, load balancers, network accelerators, and specialty processors. Appliance 490 may act as a gateway, a proxy, or a translator between server 440 and network 460.

Note that different embodiments of the present invention may use different system configurations, and are not limited to the system configuration illustrated in computing environment 400. In general, any device that is capable of storing and/or dynamically replicating data segments may incorporate elements of the present invention.

Figure 5:
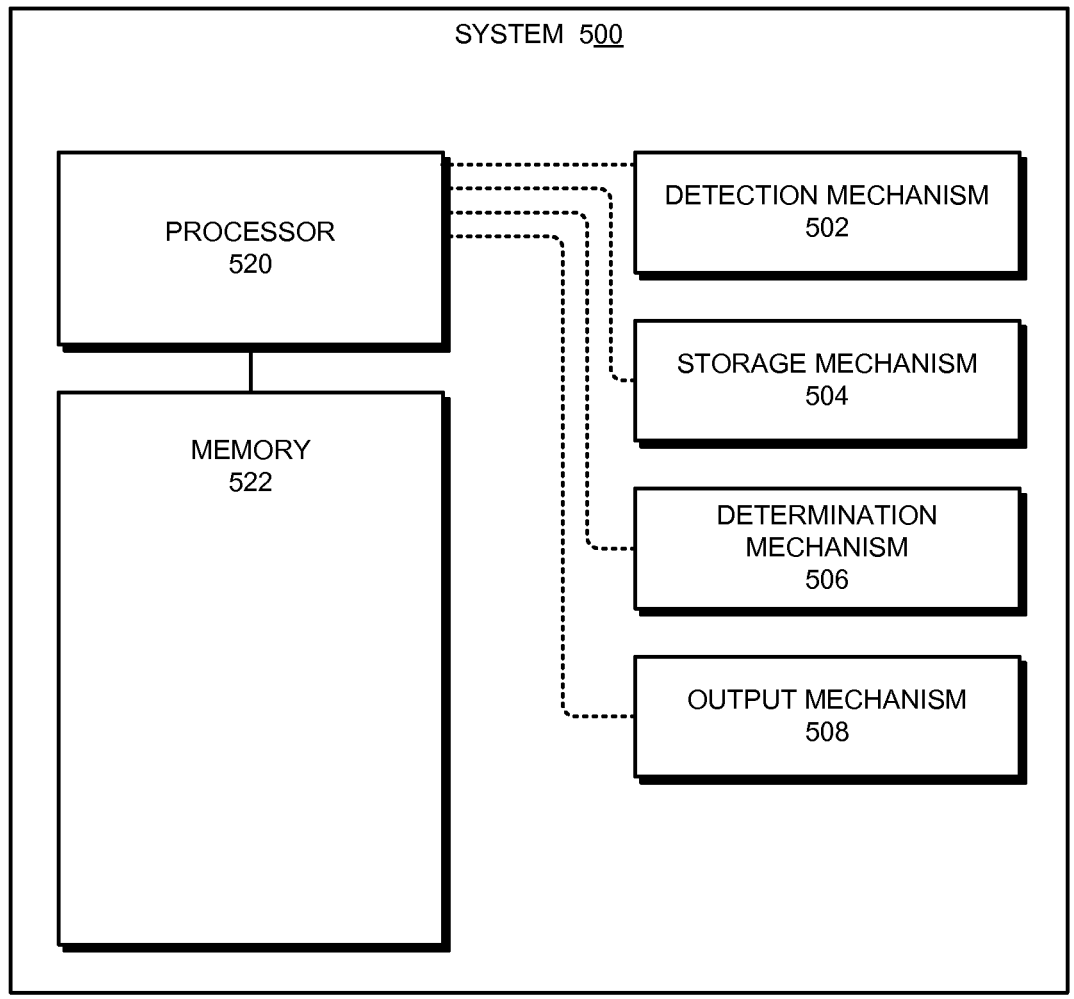
FIG. 5 illustrates a system in accordance with an embodiment.

FIG. 5 illustrates a system 500 that includes a processor 520, memory 522, detection mechanism 502, storage mechanism 504, determination mechanism 506, and output mechanism 508. System 500 uses detection mechanism 502, storage mechanism 504, determination mechanism 506, and output mechanism 508 to encapsulate and manage diagnostic information.

During operation, system 500 uses detection mechanism 502 to detect an event that involves diagnostic information. Storage mechanism 504 stores this diagnostic information in a format that preserves semantic information associated with the event. Determination mechanism 506 then determines an output context for the diagnostic information. Next, output mechanism 508 uses the preserved semantic information to output the diagnostic information in a context-sensitive format based on the output context.

In some embodiments of the present invention, some or all aspects of detection mechanism 502, storage mechanism 504, determination mechanism 506, and/or output mechanism 508 can be implemented as dedicated hardware modules in system 500. These hardware modules can include, but are not limited to, processor chips, application-specific integrated circuit (ASIC) chips, field-programmable gate arrays (FPGAs), memory chips, and other programmable-logic devices now known or later developed.

Although FIG. 5 illustrates detection mechanism 502, storage mechanism 504, determination mechanism 506, and output mechanism 508 as being external to processor 520, in alternative embodiments some or all of these mechanisms can be included in processor 520. For example, processor 520 can include one or more specialized circuits for performing the operations of the mechanisms. Alternatively, some or all of the operations of detection mechanism 502, storage mechanism 504, determination mechanism 506, and/or output mechanism 508 may be performed using general-purpose circuits in processor 520 that are configured using processor instructions.

In these embodiments, when the external hardware modules are activated, the hardware modules perform the methods and processes included within the hardware modules. For example, in some embodiments of the present invention, the hardware module includes one or more dedicated circuits for performing the operations described below. As another example, in some embodiments of the present invention, the hardware module is a general-purpose computational circuit (e.g., a microprocessor or an ASIC), and when the hardware module is activated, the hardware module executes program code (e.g., BIOS, firmware, etc.) that configures the general-purpose circuits to perform the operations described above.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method, comprising:
   detecting an event that causes a compiler to generate diagnostic information;
   storing the diagnostic information for the event in a manner that preserves semantic information associated with the event;
   receiving diagnostic information at a particular development tool, wherein the diagnostic information was generated by the compiler while compiling source code for a program created using the development tool, wherein the diagnostic information has a structured representation that is configured to be plugged into at least one diagnostic formatter from a set of diagnostic formatters, which comprises:
      a raw diagnostic formatter that outputs diagnostic information using an internal format of the compiler for diagnostic information;
      a tunneling diagnostic formatter that encodes the diagnostic information into a structured XML document;
      a rich diagnostic formatter that performs the following modifications to the diagnostic information:
         localizing the diagnostic output;
         shortening a unique name in the diagnostic information while preserving the name's uniqueness;
         lengthening a clashing name in the diagnostic information to make the clashing name unique; and
         adding a where clause to the diagnostic information that provides additional type information for variables in the diagnostic information;
   selecting the raw diagnostic formatter from the set of diagnostic formatters based on a particular output context for the particular development tool;
   using the raw diagnostic formatter to modify at least a particular part of the diagnostic information before presenting the particular part of the diagnostic information to a user through the particular development tool;
   selecting the rich diagnostic formatter from the set of diagnostic formatters;
   tunneling the diagnostic information through one or more intermediate application layers to a subsequent development tool;
   using the rich diagnostic formatter to modify at least a subsequent part of the diagnostic information before presenting the subsequent part of the diagnostic information to the user through the subsequent development tool;
   comparing the modified particular part of the diagnostic information or the modified subsequent part of the diagnostic information to a reference diagnostic output generated by a reference compiler; and
   presenting the modified particular part of the diagnostic information to the user through the particular development tool, the modified subsequent part of the diagnostic information to the user through the subsequent development tool and results of the comparison to the reference diagnostic output.

2. The method of claim 1, wherein presenting the diagnostic information a particular diagnostic tool and a subsequent diagnostic tool comprises one of:
   presenting the diagnostic information through the particular diagnostic tool simultaneously with presenting the diagnostic information through the subsequent diagnostic tool; and
   presenting the diagnostic information through the subsequent diagnostic tool after presenting the diagnostic information through the particular diagnostic tool.

3. The method of claim 1, wherein prior to receiving the diagnostic information at the particular development tool, the method further comprises generating the diagnostic information at the compiler by performing the following operations:
   while attempting to compile the source code at the compiler, detecting an event that causes the compiler to generate the diagnostic information; and
   storing the diagnostic information for the event in the structured representation in a manner that preserves semantic information associated with the event.

4. The method of claim 3, wherein the structured representation for the diagnostic information includes the following information:
   an identifier that uniquely identifies an underlying diagnostic issue;
   an identifier for a file containing source code associated with the underlying diagnostic issue;
   position information specifying a location in the source code associated with the underlying diagnostic issue; and
   additional information about the underlying diagnostic issue.

5. The method of claim 1, wherein transforming the diagnostic information includes varying one or more of the following based on the output context:
- a length of the outputted diagnostic information;
- a level of detail for the outputted diagnostic information; and
- a level of verbosity for the outputted diagnostic information.

6. The method of claim 1,
wherein the diagnostic information passes through one or more intermediate application layers before being presented to the user; and
wherein modifying the diagnostic information comprises encoding the diagnostic information in an output format that facilitates passing the diagnostic information through the one or more intermediate application layers while preserving the semantic information associated with the event.

7. The method of claim 1, wherein the set of diagnostic formatters further includes
a tunneling diagnostic formatter that facilitates tunneling the diagnostic information through one or more intermediate application layers to a software development tool.

8. The method of claim 1, wherein presenting modified diagnostic information to the user additionally includes doing one or more of the following:
adjusting the modified diagnostic information based on a type of event that caused the diagnostic information to be generated; and
adjusting the modified diagnostic information based on a source of the event that caused the diagnostic information to be generated.

9. The method of claim 1, wherein at least one of the diagnostic formatters causes one or more filepaths within the diagnostic information to be canonicalized.

10. The method of claim 1, wherein at least one of diagnostic formatter modes causes the diagnostic output to be localized.

11. One or more non-transitory computer-readable storage media storing instructions that when executed by a computer cause the computer to perform a method, the method comprising:
detecting an event that causes a compiler to generate diagnostic information;
storing the diagnostic information for the event in a manner that preserves semantic information associated with the event;
receiving diagnostic information at a particular development tool, wherein the diagnostic information was generated by the compiler while compiling source code for a program created using the development tool, wherein the diagnostic information has a structured representation that is configured to be plugged into at least one diagnostic formatter from a set of diagnostic formatters, which comprises:
a raw diagnostic formatter that outputs diagnostic formatter that outputs diagnostic information using an internal format of the compiler for diagnostic information;
a tunneling diagnostic formatter that encodes the diagnostic information into a structured XML document;
a rich diagnostic formatter that performs the following modifications to the diagnostic information:
localizing the diagnostic output;
shortening a unique name in the diagnostic information while preserving the name's uniqueness;
lengthening a clashing name in the diagnostic information to make the clashing name unique; and
adding a where clause to the diagnostic information that provides additional type information for variables in the diagnostic information;
selecting the raw diagnostic formatter from the set of diagnostic formatters based on a particular output context for the particular development tool;
using the raw diagnostic formatter to modify at least a particular part of the diagnostic information before presenting the particular part of the diagnostic information to a user through the particular development tool;
selecting the rich diagnostic formatter from the set of diagnostic formatters;
tunneling the diagnostic information through one or more intermediate application layers to a subsequent development tool;
using the rich diagnostic formatter to modify at least a subsequent part of the diagnostic information before presenting the subsequent part of the diagnostic information to the user through the subsequent development tool;
comparing a modified particular part of the diagnostic information or a modified subsequent part of the diagnostic information to a reference diagnostic output generated by a reference compiler; and
presenting the modified particular part of the diagnostic information to the user through the particular development tool, the modified subsequent part of the diagnostic information to the user through the subsequent development tool and results of the comparison to the reference diagnostic output.

12. The one or more non-transitory computer-readable storage media of claim 11, wherein presenting the diagnostic information through the particular and subsequent diagnostic tools comprises one of:
presenting the diagnostic information through a particular diagnostic tool simultaneously with presenting the diagnostic information through the subsequent diagnostic tool; and
presenting the diagnostic information through the subsequent diagnostic tool after presenting the diagnostic information through the particular diagnostic tool.

13. The one or more non-transitory computer-readable storage media of claim 11, wherein prior to receiving the diagnostic information at the particular development tool, the method further comprises generating the diagnostic information at the compiler by performing the following operations:
while attempting to compile the source code at the compiler, detecting an event that causes the compiler to generate the diagnostic information; and
storing the diagnostic information for the event in the structured representation in a manner that preserves semantic information associated with the event.

14. The one or more non-transitory computer-readable storage media of claim 13, wherein the structured representation for the diagnostic information includes the following information:
an identifier that uniquely identifies a underlying diagnostic issue;
an identifier for a file containing source code associated with the underlying diagnostic issue;

position information specifying a location in the source code associated with the underlying diagnostic issue; and additional information about the underlying diagnostic issue.

15. The one or more non-transitory computer-readable storage media of claim 11, wherein transforming the diagnostic information includes varying one or more of the following based on the output context:

a length of the outputted diagnostic information;

a level of detail for the outputted diagnostic information; and a level of verbosity for the outputted diagnostic information.

16. The one or more non-transitory computer-readable storage media of claim 11, wherein the diagnostic information passes through one or more intermediate application layers before being presented to the user; and wherein modifying the diagnostic information comprises encoding the diagnostic information in an output format that facilitates passing the diagnostic information through the one or more intermediate application layers while preserving the semantic information associated with the event.

17. The one or more non-transitory computer-readable storage media of claim 11, wherein the set of diagnostic formatters further includes a tunneling diagnostic formatter that facilitates tunneling the diagnostic information through one or more intermediate application layers to a software development tool.

18. The one or more non-transitory computer-readable storage media of claim 11, wherein presenting modified diagnostic information to the user additionally includes doing one or more of the following:

adjusting the modified diagnostic information based on a type of event that caused the diagnostic information to be generated; and adjusting the modified diagnostic information based on a source of the event that caused the diagnostic information to be generated.

* * * * *

UNITED STATES PATENT AND TRADEMARK OFFICE
CERTIFICATE OF CORRECTION

| | | |
|---|---|---|
| PATENT NO. | : 9,582,394 B2 | Page 1 of 2 |
| APPLICATION NO. | : 12/824992 | |
| DATED | : February 28, 2017 | |
| INVENTOR(S) | : Cimadamore et al. | |

It is certified that error appears in the above-identified patent and that said Letters Patent is hereby corrected as shown below:

In the Drawings

On sheet 4 of 6, in FIG. 3, under Reference Numeral 330, Line 2, delete "DIAGOSTIC" and insert -- DIAGNOSTIC --, therefor.

In the Specification

In Column 4, Line 42, after "code)" insert -- . --.

In Column 4, Line 63, delete "string" and insert -- String --, therefor.

In Column 6, Line 5, delete "string," and insert -- String, --, therefor.

In Column 9, Line 34, delete "DiagnosticFormatter" and insert -- Diagnostic Formatter --, therefor.

In Column 9, Lines 36-37, delete "DiagnosticFormatter" and insert -- Diagnostic Formatter --, therefor.

In Column 9, Line 37, delete "AbstractDiagnosticFormatter" and insert -- Abstract Diagnostic Formatter --, therefor.

In Column 9, Line 44, delete "DiagnosticFormatter" and insert -- Diagnostic Formatter --, therefor.

In Column 9, Lines 45-46, delete "ForwardingDiagnosticFormatter" and insert -- Forwarding Diagnostic Formatter --, therefor.

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*

In the Claims

In Column 20, Line 36, in Claim 2, after "information" insert -- through --.